United States Patent [19]

Woo

[11] 4,111,864

[45] * Sep. 5, 1978

[54] SULFUR FOAM

[75] Inventor: Gar Lok Woo, Tiburon, Calif.

[73] Assignee: Chevron Research Company, San Francisco, Calif.

[*] Notice: The portion of the term of this patent subsequent to Jun. 3, 1992, has been disclaimed.

[21] Appl. No.: 708,469

[22] Filed: Jul. 26, 1976

Related U.S. Application Data

[63] Continuation of Ser. No. 516,229, Oct. 18, 1974, abandoned, which is a continuation-in-part of Ser. No. 438,508, Jan. 31, 1974, Pat. No. 3,887,504, and Ser. No. 344,694, Mar. 26, 1973, Pat. No. 3,892,686, which is a continuation-in-part of Ser. No. 253,144, May 15, 1972, abandoned.

[51] Int. Cl.$^2$ ............................ C08G 53/08; C08J 1/22
[52] U.S. Cl. ................................ 521/117; 260/18 TW; 260/30.8 R; 260/37 N; 260/858; 260/859 R; 521/132; 521/155; 521/157; 521/120
[58] Field of Search ........................... 260/2.5 R, 2.5 A

[56] References Cited

U.S. PATENT DOCUMENTS

| | | | |
|---|---|---|---|
| 3,887,504 | 6/1975 | Woo | 260/2.5 A |
| 3,892,686 | 7/1975 | Woo | 260/2.5 R |
| 3,954,685 | 5/1976 | Woo | 260/2.5 R |
| 4,011,179 | 3/1977 | Woo et al. | 260/2.5 R |

*Primary Examiner*—Morton Foelak
*Attorney, Agent, or Firm*—Dix A. Newell; John Stoner, Jr.; A. T. Bertolli

[57] ABSTRACT

A process for producing sulfur foam containing at least 50 weight percent sulfur, which comprises: (a) reacting molten sulfur with an organic protonic acid which is reactive with molten sulfur so as to incorporate the organic acid with sulfur to form a sulfur-organic acid adduct containing protonic acid groups; (b) mixing an organic surfactant agent with the adduct to obtain a mixture of adduct and surfactant agent; and then (c) reacting the mixture with a polyisocyanate to obtain sulfur foam.

23 Claims, 1 Drawing Figure

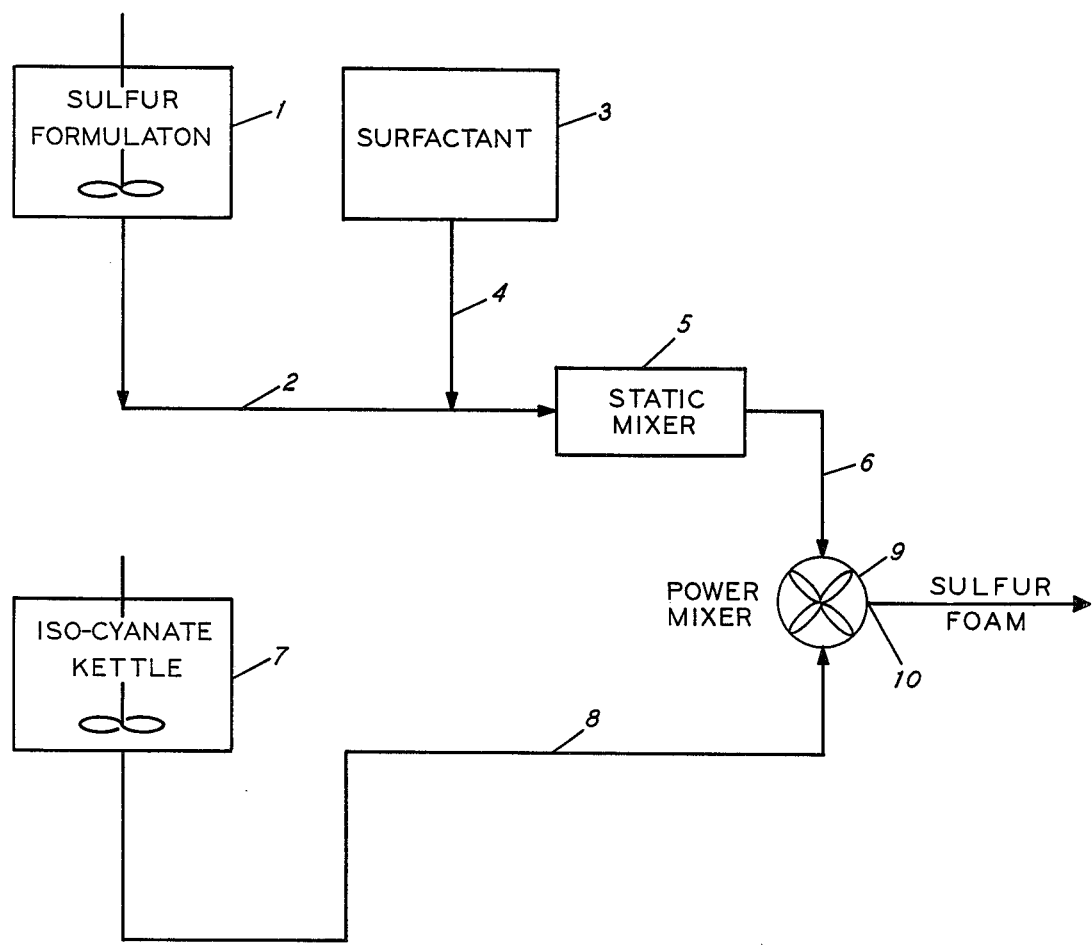

SULFUR FOAM

CROSS REFERENCE TO RELATED APPLICATIONS

This application is a continuation of application Ser. No. 516,229, filed Oct. 18, 1974, now abandoned, which in turn is a continuation-in-part of application Ser. No. 438,508, filed Jan. 31, 1974, now U.S. Pat. No. 3,887,504 and application Ser. No. 344,694, filed Mar. 26, 1973, now U.S. Pat. No. 3,892,686, which in turn is a continuation-in-part of application Ser. No. 253,144, filed May 15, 1972, now abandoned, the disclosures of which are incorporated herein by reference.

BACKGROUND OF THE INVENTION

The present invention relates to the preparation of a foamed material, particularly a sulfur foam.

U.S. Pat. No. 3,337,355, issued to Dale and Ludwig, discloses the production of a sulfur foam using the following steps:

(a) heating sulfur to above its melting point;
(b) blending a stabilizing agent with the molten sulfur;
(c) blending a viscosity increaser with the molten sulfur, steps (b) and (c) being taken in either order with respect to the other;
(d) forming bubbles in the molten sulfur, and
(e) cooling the molten sulfur to below its melting point.

Stabilizing agents disclosed include talcs, mica and plate-like particles. Viscosity increasers disclosed include phosphorus sulfide, styrene monomers and polysulfide liquids. According to U.S. Pat. No. 3,337,355:

"The forming of bubbles in the molten sulphur may be done in any conventional manner for forming foams generally such as those methods used in forming plastic foams. These include (1) mechanically mixing a gas such as air with the molten sulphur, (2) adding a blowing agent, and (3) mixing a liquid with the molten sulphur while maintaining a predetermined pressure on the sulphur and then releasing the pressure on the sulphur sufficiently that the liquid will vaporize at the temperature and lower pressure involved. All of these methods must use material free from substances having a deleterious effect upon the process. For example, most members of the halogen family will decrease the viscosity of the sulphur sufficiently that proper foams will not be formed. Examples of blowing agents that are satisfactory are a combination of sodium carbonate or bicarbonate and acid, N,N'-dimethyl N,N'-dinitrosoterephthalamide sold under the trade name Nitrosan, sodium bicarbonate dispersed in a neutral oil sold under the trade name Unicel S, and N,N'-dinitrosopentamethylenetetramine sold under the trade name Unicel ND. Nitrosan, Unicel S, and Unisel ND are products of E. I. du Pont de Nemours & Co."

According to the examples in U.S. Pat. No. 3,337,355, typical ingredients for the sulfur foam include sulfur, talc, $P_2S_5$, calcium carbonate and phosphoric acid.

By retrospect in view of the present invention, art in the area of polyurethane foams can also be referred to by way of background. As indicated in Kirk-Othmer Encyclopedia of Chemical Technology (1965), Vol. 9, p. 853, the chemical ingredients of a urethane foam are a polyfunctional isocyanate (1) and a hydroxyl-containing polymer (2) along with catalysts to control the rate and type of reaction and other additives to control the surface chemistry of the process. A number of competing reactions can occur when (1) and (2) are brought together, but the main product, shown in the equation below, is a urethane (3).

(1)      (2)

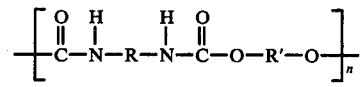

(3)

Originally, carbon dioxide was generated in situ (by the reaction of isocyanate with water) as a blowing agent for both rigid and flexible polyurethane foams. U.S. Pat. No. 2,814,600 discloses production of polyurethane foams by reaction of isocyanate groups with water to release carbon dioxide.

It is said to still be the common practice today to rely largely on reaction of water with isocyanate as a method for gas generation for flexible materials. Rigid cellular polyurethanes are now typically produced using volatile liquids, usually fluorocarbons, which act as expanding agents, producing gas as the foaming mixture is heated by the exotherm of the reaction.

Although it is not the typical method used to make polyurethane foams, it has been disclosed to react carboxylic acid groups with isocyanate groups to form amide bonds and release carbon dioxide. See, for example, Saunders and Frisch, "Polyurethanes", Part I, Interscience Publishers (1962) at p. 79.

U.S. Pat. No. 3,222,301 discloses polyurethane foams containing a small amount of dissolved sulfur to prevent discoloration of the polyurethane foam. As can be seen from the examples of U.S. Pat. No. 3,222,301, only a very small amount of sulfur is included in the final foam; one of the reactants for formation of the foam can pick up the necessary small amount of sulfur by filtering the reactant through finely divided sulfur prior to using the reactant to form the foam.

U.S. Pat. No. 3,542,701 discloses the use of sulfur in various foams, including polystyrene foams as well as polyurethane foams, to decrease the inflammability of the foam. According to U.S. Pat. No. 3,542,701, "The total amount of elementary sulfur in the foam of other cellular structure may be as high as slightly under 50% by weight". The process of U.S. Pat. No. 3,542,701 is stated to be: " . . . applicable to all foams or other cellular or porous structures of combustible synthetic macromolecular substances, without exceptions, although the best results are obtained with substances, which at the temperatures applied in the preparation of the foams or other cellular or porous structures of these substances hardly react with sulfur if at all."

U.S. Pat. Nos. 2,814,600 and 3,169,119 disclose the production of polyurethane foams from arylene diisocyanates and liquid polysulfide polymers. U.S. Pat. No. 3,169,119 discloses the use of a "foam stabilizer" or surfactant, such as a silicone oil, for example a polydimethyl siloxane or an alkyl silane polyoxyalkylene block copolymer. The latter type of silicone oil is disclosed in U.S. Pat. No. 2,834,748.

U.S. Pat. No. 3,645,924 also discloses, at Col. 7, line 52 to Col. 8, line 22, surfactants which can be employed to obtain uniform cell structure in making polyurethane foams.

Similarly, U.S. Pat. No. 3,706,680 discloses the use of poly organo silicone compounds as well as polypropylene glycols as suitable surface active agents or emulsifiers that can be used in polyurethane foam production.

"Polyurethane Techology," edited by P. F. Brunes, Interscience Publishers, 1969, describes in general at pp. 50–52 the use of poly organo silicone surfactants in polyurethane foam preparation. At page 51, the following is stated: "The surfactant may be added with any of the two to six streams usually fed to the mixing head in the one-shot process. The addition of the silicone as a separate stream affords the maximum in control over loss of foam stability, since surfactant concentration may be adjusted independently of reactants and catalysts."

In Technical Data Bulletin 0.5M-5-69-H-TD-6 by Houdry Process and Chemical Company, Houdry's surfactant R-150, an all-organic compound, is disclosed as being suitable as a surfactant in polyurethane foam preparation similar to the more typically used poly organo silicone surfactants. The bulletin states: "Houdry R-150" may be added to either the polyol or isocyanate.

Further information concerning silicone-type surfactants can be found in "Advances in Urethane Science and Technology", Vol. 2, by R. C. Frisch and S. L. Rugen, Technomatic Publishing Co., 1973, page 201.

In the Dow-Corning Product Bulletin, "Surfactants for Rigid Urethane Foam", at page 2, Dow-Corning surfactants 193 and 195 for use in polyurethane foam preparation are disclosed as being usable either in the polyol or isocyanate streams used to make polyurethane foams.

SUMMARY OF THE INVENTION

According to the present invention, a process is provided for producing sulfur foams containing at least 50 weight percent sulfur, which process comprises: (a) reacting molten sulfur with an organic protonic acid which is reactive with molten sulfur so as to incorporate the organic acid with sulfur to form a sulfur-organic acid adduct containing protonic acid groups; (b) mixing an organic surfactant agent with the adduct to obtain a mixture of adduct and surfactant agent; and then (c) reacting the mixture with a polyisocyanate to obtain sulfur foam.

According to a preferred embodiment of the present invention, a continuous process is provided for producing sulfur foam containing at least 50 weight percent sulfur, which process comprises: (a) reacting, in a first zone, molten sulfur with an organic protonic acid which is reactive with molten sulfur so as to incorporate the organic acid with sulfur to form a sulfur-organic acid adduct containing protonic acid groups; (b) mixing, in a second zone, the adduct with an organic surfactant agent to obtain a mixture of adduct and surfactant agent; and (c) reacting, in a third zone, a polyisocyanate with the mixture to obtain sulfur foam.

As will be apparent from the further description herein, the sulfur adduct material, to which the surfactant is added per step (b), can comprise further compounds than just sulfur and an organic acid. However, in the process of the present invention, it is important to mix the surfactant with the sulfur adduct material after formation of the sulfur adduct material, but substantially immediately before the step (c) mixing of the isocyanate with the sulfur adduct material. Preferably there is only about 0.05 second to 2 minutes between mixing of the surfactant with the sulfur adduct material and addition of the polyisocyanate to the system, more preferably only about 0.05 to 10 seconds between the surfactant addition and the polyisocyanate addition.

Among other factors, the present invention is based on my finding that foams with more uniform and fine cell structure can be obtained when operating with the surfactant mixing into the system in the particular sequence as just stated, as opposed, for example, to adding the surfactant to the polyisocyanate and then combining the polyisocyanate with the sulfur adduct material. Also, the foam produced in accordance with the present invention avoids difficulties that are incurred if the surfactant is added to the sulfur during or before formation of the sulfur adduct material.

The highly uniform foams produced by the process of the present invention are advantageous in that strength properties and insulation properties are more consistent than in foams with cracks or irregularities or coarse or flat cells.

The process of the present invention is particularly suited for the production of low-density foams, i.e., foams having a weight less than about 20 pounds per cubic foot.

The term "adduct" is used herein to connote formation of one or more chemical bonds between the sulfur and the organic acid.

The term "foam" is used herein to mean a cellular material containing a gas in the cells. When initially formed, the foam may be finely divided gas bubbles in liquid, but after cooling, the foam becomes a flexible or rigid solid containing gas bubbles.

The foams prepared in accordance with the present invention contain more than about 50 weight percent sulfur. My earlier application, Ser. No. 438,508, is directed to a basic process for preparing this type of foam by reacting a sulfur-organic acid adduct material with a polyisocyanate. The foams contemplated by the present invention thus contain large amounts of sulfur.

The reactions of the present invention are preferably carried out under substantially anhydrous conditions, for examples less than 0.2 weight percent water, based on the sulfur.

The organic acids used in the present invention are restricted to those which are reactive with molten sulfur, i.e., reactive with sulfur at a temperature above about 115° C., to yield a sulfur-organic acid adduct. Preferably the temperature range of this reaction is about 115° to 235° C. More preferably, the temperature range is 135°–160° C.

In the present invention, a wide variety of acids can be used, as the present invention is based on a combination of steps wherein the substances used for the steps must perform certain functions, as are indicated herein. The acids must retain the acid moiety after reaction with sulfur.

The organic acids which are disclosed in the aforesaid Ser. No. 253,144 and Ser. No. 344,694 can in general be used in the present invention.

Exemplary acids include sulfur-containing acids such as dithiodipropionic acid, dithioglycolic acid, and other similar acting dithio acids, mercaptoacetic acid, 3-mercaptopropionic acid, and other similar acting mercapto acids, 1,2-dithiane-3,6-dicarboxylic acid, 1,2-dithiolane- 4-carboxylic acid, 6,8-thioetic acid, p-mercaptobenzoic acid, mercaptophenylacetic acid, etc.; unsaturated monocarboxylic acids such as acrylic acid, oleic acid, methacrylic acid, monoesters of maleic or fumaric acid (methyl fumarate), monoally esters of dibasic acids (allyl succinate, allyl adipate), etc.; unsaturated polycarboxylic acids having at least 5 carbon atoms such as 2-pentene-1,5-dicarboxylic acid, 4-octene-1,8-dicarboxylic acid, 3-hexene-1,6-dicarboxylic acid; acid-esters having unsaturation formed by the reaction of an unsaturated dibasic or polybasic acid and a polyhydric alcohol or monoesters of a saturated polybasic acid and an unsaturated polyhydric alcohol (trimethylolpropane-trimaleate), etc.; and saturated acids which in the presence of molten sulfur are converted to sulfurized acids such as palmitic acid, stearic acid, hexane carboxylic acid, various naphthenic acids, etc.

Among the useful sulfonic acids are hexane sulfonic acid, dodecylbenzene sulfonic acid, beta-hydroxyoctane sulfonic acid, 3-hexene sulfonic acid, etc. Among other useful acids are octadecylbenzeneboronic acid, vinylbenzene boronic acid, 3-pentenylphosphinic acid, dihexylphosphinic acid, dicrotyl hydrogen phosphate, the cyclic diesters of boric acid, saturated and unsaturated cis-1,2- and 1,3-diols, etc.

The organic carboxylic acids are particularly preferred, especially monoolefinic carboxylic acids having from 3 to 30, preferably from 3 to 15, carbon atoms. In this connection, it can be noted that some saturated acids will be satisfactory for use in the present invention. For example, if a saturated acid such as hexadecanoic acid is heated with sulfur, hydrogen sulfide is evolved and the hexadecanoic acid is dehydrogenated to form an unsaturated acid, which is then further transformed into a sulfurized acid. Unsaturated acids are preferred reactive acids for forming the sulfur-acid adduct. The unsaturated acids are believed to react with the molten sulfur principally at the double (or triple) carbon-carbon bond. Dithio organic acids are believed to react with the molten sulfur at the sulfur-sulfur bond of the dithio acid. In any case, in accordance with the present invention, the organic acid must react with the sulfur to form a sulfur-organic acid adduct containing protonic acid groups.

Preferably the unsaturated, dithio or mercapto acids used in the process of the present invention have from 2 to 30 carbon atoms. Particularly preferred organic acids for use in the process of the present invention include acrylic acid, dithiodipropionic acid, 3-mercaptopropionic acid, 2-mercaptobenzoic acid, methacrylic acid and 2-mercaptoacetic acid.

The quantity of acid to be incorporated varies from 0.001 to 1.0, preferably 0.005 to 0.15, g-mol acid equivalents per 100 grams of sulfur. When the foaming agent is carbon dioxide resulting from an acid/isocyanate reaction, the higher levels of acid concentration give foams of low bulk density, whereas the lower levels result in foams of high bulk density.

Acrylic acid is an especially preferred acid for use in the process of the present invention. In general, preferred amounts of acrylic acid for use in the present invention are from 0.2 to 15, more preferably from 1 to 7, in weight percent, calculated as weight percent of the sulfur. It should be recognized that higher quantities of acid may be reacted with sulfur to form the adduct, and then this adduct can be diluted with sulfur to give a final acid concentration within the above ranges.

The polyisocyanates used herein are cross-linking agents which react with the acid groups of the sulfur-acid adduct to liberate carbon dioxide and at the same time effect cross-linking. Suitable polyisocyanates include both aliphatic and aromatic isocyanates, as are defined in the above-referenced patent applications, Ser. Nos. 253,144 and 344,694. The polyisocyanates must be soluble or liquid at the foaming temperature.

Preferred polyisocyanates for use in the present invention are di- and triisocyanates which are soluble or liquid at the molten-sulfur foaming temperature. Particularly preferred are the relatively low volatility mixed isocyanates sold under the trade names of PAPI and MONDUR MR. The isocyanate groups of the polyisocyanate used in the process of the present invention will be part of an organic compound; the important feature of the organic polyisocyanate compound is that it contains at least two isocyanate groups capable of reacting with a protonic acid group to form an amide bond and release carbon dioxide. Many such polyisocyanate compounds are known by those skilled in the art.

The organic polyisocyanates which may be employed include aromatic and aliphatic as well as heterocyclic materials. Examples of suitable aromatic materials include tolylene 2,4-diisocyanate, 4,4'-diphenylmethane diisocyanate, tolylene 2,6-diisocyanate, polymethylene polyphenyl isocyanate (polymeric material made by Upjohn), bitolylene diisocyanate, dianisidene diisocyanate, triphenylmethane diisocyanate, and 3,3'-dichloro-4,4'-diphenylene diisocyanate. The aliphatic and cycloaliphatic materials which may be employed include such materials as hexamethylene diisocyanate, ethylidene diisocyanate, propylene-1,2-diisocyanate, cyclohexylene-1,2-diisocyanate, etc. The isothiocyanate analogs of these materials may be employed, examples of which include ethylidene diisothiocyanate, butylene-1,2-diisothiocyanate and paraphenylene diisothiocyanate.

Another type of polyisocyanate useful in the process of this invention is the so-called prepolymer adducts of a polyhydroxy, polythiol or polyamino compound and excess polyisocyanate, for example, the product from the reaction of one mol of ethylene glycol and two mols of toluene diisocyanate. In general, the pre-polymers have the formula:

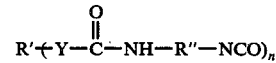

wherein R' is the nucleus of a polyhydric compound having $n$ hydroxy groups, R" is a diradical, Y is O, S, or NR''', R''' is H or low-molecular-weight alkyl group or an aryl group, and $n$ has a value of 2 to 6. Typical compounds include the reaction product of toluene diisocyanate with diethylene glycol, of p,p'-diphenylmethane diisocyanate with trimethylolpropane, of m-xylylene diisocyanate with decane 1,10-diol, and of toluene diisocyanate with the adduct of trimethylol propane and propylene oxide and/or ethylene oxide, toluene diisocyanate with polytetramethylene glycol, etc. The preferred polyisocyanates are aromatic diisocyanates having boiling points higher than 130° C., and mobile at the molten-sulfur foaming temperature.

Particularly preferred polyisocyanates are hexamethylene diisocyanate, dianisidene diisocyanate, tolylene 2,4-diisocyanate, 4,4'-diphenylmethane diisocyanate, polymethylene polyphenyl isocyanate, 4,4'diphenylene diisocyanate.

Polyisothiocyanates are also suitable for use in making sulfur foams by the process of the present invention. When using isothiocyanates, the blowing or foaming agent formed by reaction with the acid contains COS. Satisfactory polyisothiocyanates are any of the above polyisocyanates having an isothiocyanate group in place of the isocyanate group.

In a preferred method of carrying out the process of the present invention, the sulfur may be plasticized by the addition of about 1 to 99, preferably 1 to 50, parts of a plasticizer per 100 parts of sulfur. Preferably after plasticization is complete, the organic acid is added to form the sulfur-acid adduct using the plasticized sulfur, and the process is continued as before. In another embodiment, the plasticizer can be added to the sulfur-acid mixture. The acid and plasticizer can also be added to the sulfur simultaneously. Plasticizers are useful to reduce cracking, especially surface cracking as occurs with some unplasticized sulfur foam. The acid ingredient itself is sometimes a sufficient plasticizer, but at other times extra, nonacidic plasticizers are needed or at least are advantageous in producing a good sulfur foam. Plasticizers are well known in the sulfur art (see Alberta Sulfur Research, LTD., Quarterly Bulletin, Vol. VIII, No. 4, January-March 1972), and frequently include compounds having one or more sulfur atoms in the molecule.

Plasticized sulfur usually has a lower melting point and a higher viscosity than elemental sulfur. Furthermore, plasticized sulfur requires a longer time to crystallize; i.e., the rate of crystallization of plasticized sulfur is slower than that of elemental sulfur. One useful way to measure the rate of crystallization is as follows: the test material (0.040 g) is melted on a microscope slide at 130° C. and is then covered with a square microscope slide cover slip. The slide is transferred to a hot-plate and is kept at a temperature of 78°±2° C., as measured on the glass slide using a surface pyrometer. One corner of the melt is seeded with a crystal of test material. The time required for complete crystallization is measured. Plasticized sulfur, then, is sulfur containing an additive which increases the crystallization time within experimental error, i.e., the average crystallization time of the plasticized sulfur is greater than the average crystallization time of the elemental sulfur feedstock. For the present application, plasticizers are those substances which, when added to or reacted with molten, elemental sulfur, cause an increase in crystallization time in reference to the elemental sulfur itself. In one set of experiments, elemental sulfur required 0.44 minute to crystallize under the above conditions, whereas sulfur containing 3.8% of a phenol-sulfur adduct (as described in Ser. No. 344,694) required 2.9 minutes. Sulfur containing 6.6% and 9.9% of the same phenol-sulfur adduct required 5.7 and 22 minutes, respectively.

Inorganic plasticizers include iron, arsenic and phosphorus sulfides, but the particularly preferred plasticizers are organic compounds which can react with sulfur to give sulfur-containing materials, such as styrene, alpha-methylstyrene, dicyclopentadiene, vinyl cyclohexene, the aromatic compound-sulfur adducts of Ser. No. 344,694, as well as the aromatic compounds used to produce these adducts, liquid polysulfides (e.g., those sold under the trade name of Thiokol LP-3 or LP-32), and the viscosity control agents described in U.S. Pat. Nos. 3,674,525, 3,453,125 and 3,676,166. The preferred aromatic plasticizing compounds are styrene and the phenol-sulfur adduct of Ser. No. 344,694. The preferred aliphatic compounds are dicyclopentadiene and linear polysulfides. When phenol is used as the plasticizer, in order to obtain plasticization it is necessary to get the phenol to react with the sulfur; this reaction can advantageously be effected using base catalysis, e.g., using sodium hydroxide.

The quantity of plasticizer to be added varies with the nature of the plasticizer, but usually is in the range 0.5 to 40 weight percent, based on the final composition. Styrene, for example, is preferably used at the 1- to 10-weight-percent level, whereas polyunsaturated olefins such as dicyclopentadiene are preferably used at the 1- to 5-weight-percent level. The upper limit on plasticizer concentration is determined by the viscosity of the resulting plasticized sulfur. Final viscosity must be such that the composition will flow at the desired temperature and will also be able to be mixed with liquid polyisocyanate.

The surfactant used in the present invention is an organic material which is effective to aid in the production of a uniform cell structure in the sulfur flow. The surfactant typically aids in stabilizing bubbles, so that desired bubble size or cell structure can be obtained. The particular manner in which the surfactant is used in the present invention results in a highly effective use of the surfactant. That is, the particular manner of using the surfactant in the over-all process combination of the present invention is highly effective to aid in producing relatively uniform cell sizes (bubble sizes) in the foam while tending to avoid cracks, unevenness or flatness in cell structure that may contribute to localized partial collapse of the sulfur foam.

In general, I have found that surfactants useful in polyurethane foam preparation are useful in the sulfur foam preparation in accordance with the present invention. Thus, suitable surfactants include nonionic surfactants such as organosilicone compounds which are useful as surfactants in polyurethane foam formation, as referred to in the prior art discussed under "Background of the Invention." The disclosures cited under "Background of the Invention" in regard to surfactants for use in polyurethane foam formation are incorporated herein by reference.

In addition to the use of a plasticizer in some embodiments of the present invention, another optional ingredient is a solid stabilizer, which is defined as finely divided, inert material having individual particles which are plate-like in form. Examples include talc, mica, carbon black, aluminum pigment, kaolin, etc. This ingredient is usually added to the molten-sulfur mixture just before the cross-linking agent(s) is added. When used, the quantity of stabilizer varies from 1 to 15 parts per 100 parts of sulfur. Preferably the stabilizer is added prior to the addition of the isocyanate and prior to the addition of the surfactant.

In addition to, or in place of, the previously described additives, in certain applications it is desirable to add to the foam compositions other nonplate-like materials, typically those which have been employed as fillers in plastic foams. Materials of this type are described in "Plastic Foams," Vol. I, Calvin James Banning, Wiley-Interscience, 1969. Examples of such fillers include wood-derived materials such as wood flour, resins, and synthetic fibers such as nylon acrylics and polyesters, inorganic salts and oxides such as heavy metal oxides to modify electrical properties, silica and various silicates, etc. Another group of materials which can be used to modify physical properties of the foams are the inorganic flakes and fibers represented by glass fiber, mica and asbestos fillers, etc. Such fillers are employed at concentrations in the range of about 1 to 15 parts per 100 parts of sulfur, depending on the viscosity or thixotropic property of the final material. The above stabilizers and additives are particularly useful and important for getting good cell-structure foam when the amount of cross-linking is low.

The products made by the process of the present invention are solid sulfur foams comprising multiple polysulfide chains interconnected by carbon-containing groups.

The present invention is also directed to the sulfur foam products produced by any of the processes of the present invention. The sulfur foam products of the process as described above are advantageously used in applications such as insulation and as building materials, including as a subbase in road-paving construction.

The sulfur foam products of the present invention are produced using steps as described above wherein reactions are carried out at foaming temperatures such that the sulfur or plasticized sulfur is in the liquid state. In general, temperatures in the range 110° to 180° C. are satisfactory; however the preferred range is 115°–140° C. Lower temperatures can be employed for lower-melting systems, which usually contain larger amounts of plasticizers. The final sulfur foam product is typically obtained by cooling to below molten-sulfur temperature, usually approximately ambient temperature.

BRIEF DESCRIPTION OF THE DRAWING

The drawing is a schematic process flow diagram illustrating in simplified form a preferred embodiment of the present invention.

FURTHER DESCRIPTION OF THE DRAWING

The sulfur formulation kettle 1 is an insulated stainless-steel vessel equipped with steam heating coils, a heated filter and a stirrer. This kettle is charged with a previously prepared and melted sulfur formulation. A typical formulation comprises the adduct formed by the reaction of plasticized sulfur and an organic protonic acid. The molten sulfur composition is pumped from kettle 1 and passes into line 2. The surfactant is charged to vessel 3. From this vessel the surfactant passes into line 2 via line 4. The combined streams then pass into a mixer, for example a static mixer wherein the two streams become intimately admixed. This mixture is then passed through line 6 into power mixer 9.

The isocyanate, e.g., p,p'-diphenylmethane diisocyanate, is charged to vessel 7. This vessel is equipped with a heating jacket. The isocyanate is passed from vessel 7 to power mixer 9 through line 8. In the power mixer the previously combined sulfur formulation and surfactant are combined with polyisocyanate at the foaming temperature, and the combined, well-mixed product is then passed through an orifice 10 and optionally into a mold. Optionally a hose and/or a nozzle may be connected to orifice 10. Foaming takes place, and the resulting foamed-sulfur composition can be used when it has solidified.

EXAMPLES

EXAMPLE 1

Continuous Preparation of Sulfur Foam Utilizing the Process of the Present Invention The above-described apparatus was utilized in making the following foam. The large kettle was charged with 407 pounds of sulfur and 136 pounds of sulfur concentrate (prepared by heating 14 parts by weight of acrylic acid with 86 parts by weight of a phenol-sulfur reaction product containing 30% by weight of phenol). The charge was melted and stirred at 145° C. for 1.5 hours.

The surfactant tank was charged with a silicone-type surfactant (Dow's DC-193 Surfactant). The isocyanate vessel was charged with a mixture of polyisocyanates (MONDUR MR Polyisocyanate). Both the surfactant and polyisocyanate were at room temperature.

The molten, plasticized sulfur was cooled to 122° C. and pumped from kettle 1 through line 2 at 38 pounds per minute. At the same time, surfactant was pumped from vessel 3 through line 4 into the molten, plasticized sulfur at 0.23 pounds per minute. After passing through the static mixer 5, the molten, plasticized sulfur/surfactant mixture passed through line 6 into the power mixer 9 where it was combined with the polyisocyanate which was pumped from kettle 7 through line 8 at 3.7 pounds per minute. A 20-psi back pressure in the system resulted from the small nozzle size. The completely mixed material was passed through line 10 and was poured into several 1 × 1 foot molds, where it was allowed to form in place. The product made in this way gave a foam having a density of 13 pounds/ft$^3$ and excellent cell structure.

EXAMPLE 2

Batch Preparation of Sulfur Foam Utilizing the Process of the Present Invention

A plasticized sulfur composition was prepared by heating 71.4 parts by weight of sulfur with 17.8 parts by weight of a phenol-sulfur adduct which was prepared from 30 parts by weight of phenol and 70 parts by weight of sulfur. The resulting plasticized sulfur was then heated with 1.3 parts by weight of acrylic acid for 2.5 hours at 140°–145° C. This material was cooled to about 120° C. and then well mixed with 0.5 parts by weight of a surfactant (Dow DC-193 Surfactant). Immediately thereafter 8.9 parts by weight of a polyisocyanate (MONDUR MR Polyisocyanate) was added, mixed well, and the entire mass was charged to a rectangular mold.

The resulting product had a density of 18 pounds/ft$^3$. The cells were generally uniform in size.

EXAMPLE 3

Batch Preparation of Sulfur Foam Wherein the Surfactant is Combined With the Isocyanate First (A) Essentially the same procedure was followed as in Example 2, except that the surfactant was charged to the diisocyanate solution 2 hours before adding it to the plasticized sulfur. The final foamed product had a density of 20 pounds/ft$^3$. However, the cells were not uniform in size, but were considerably larger in the center of the foam. Furthermore, large horizontal and vertical cracks developed in the foam.

(B) This run was carried out as in Example 2, except that the surfactant was mixed with the polyisocyanate just 30 seconds prior to mixing the isocyanate with molten, plasticized sulfur. The foam product had a density of 21 pounds/ft$^3$. However, the cell structure had a poor cell size distribution and there were many large cells along with vertical cracks.

This example, as compared to Example 2, shows that a foam of inferior quality is obtained when the surfactant is added to the polyisocyanate prior to mixing the isocyanate with the molten, plasticized sulfur.

What is claimed is:

1. A process for producing sulfur foam containing at least 50 weight percent sulfur, which comprises:
   (a) reacting molten sulfur with an organic protonic acid which is reactive with molten sulfur so as to incorporate the organic acid with sulfur to form a sulfur-organic acid adduct containing protonic acid groups;
   (b) mixing an organic surfactant agent with the adduct to obtain a mixture of adduct and surfactant agent; and then, substantially immediately after mixing the surfactant with the adduct,
   (c) reacting the mixture with a polyisocyanate to obtain sulfur foam.

2. A continuous process for producing sulfur foam containing at least 50 weight percent sulfur which comprises:
   (a) reacting, in a first zone, molten sulfur with an organic protonic acid which is reactive with molten sulfur so as to incorporate the organic acid with sulfur to form a sulfur-organic acid adduct containing protonic acid groups;
   (b) mixing, in a second zone, the adduct with an organic surfactant agent to obtain a mixture of adduct and surfactant agent, and
   (c) reacting, in a third zone, a polyisocyanate with the mixture to obtain sulfur foam.

3. A process in accordance with claim 2 wherein the organic acid is a carboxylic acid.

4. A process in accordance with claim 3 wherein the surfactant agent is effective to aid in production of a uniform sulfur foam cell structure.

5. A process in accordance with claim 4 wherein the surfactant is an organosilicone compound.

6. A process in accordance with claim 3 wherein the organic acid is an unsaturated acid, a dithio acid, or a mercapto acid.

7. A process in accordance with claim 3 wherein the organic acid is an unsaturated aliphatic carboxylic acid containing from 3 to 30 carbon atoms.

8. A process in accordance with claim 3 wherein the organic acid is acrylic acid.

9. A process in accordance with claim 3 wherein the polyisocyanate is an aryl isocyanate containing 2 or 3 isocyanate groups.

10. A process for producing a sulfur foam containing at least 50 weight percent sulfur, which comprises contacting and reacting molten sulfur with a plasticizer and an organic protonic acid which are reactive with sulfur, to thereby obtain a modified sulfur-organic acid adduct containing protonic acid groups, mixing an organic surfactant agent with the adduct to obtain a mixture of adduct and surfactant agent; and then contacting and reacting the mixture with a polyisocyanate to obtain a sulfur foam.

11. A process in accordance with claim 10 wherein the organic acid is a carboxylic acid.

12. A process in accordance with claim 10 wherein the organic acid is an unsaturated acid, a dithio acid or a mercapto acid.

13. A process in accordance with claim 10 wherein the organic acid is an unsaturated aliphatic carboxylic acid containing from 3 to 30 carbon atoms.

14. A process in accordance with claim 10 wherein the organic acid is acrylic acid.

15. A process in accordance with claim 11 wherein the plasticizer is an aromatic compound.

16. A process in accordance with claim 15 wherein the plasticizer is styrene.

17. A process in accordance with claim 15 wherein the plasticizer is phenol.

18. A process in accordance with claim 11 wherein the plasticizer is dicyclopentadiene.

19. A sulfur foam product produced by the process of claim 1.

20. A sulfur foam product produced by the process of claim 7.

21. A sulfur foam product produced by the process of claim 11.

22. A sulfur foam product produced by the process of claim 17.

23. A process in accordance with claim 2 wherein the polyisocyanate is reacted with the mixture of adduct and surfactant about 0.05 to 10 seconds after addition of the surfactant to the adduct.

* * * * *